(12) United States Patent
Uetake et al.

(10) Patent No.: US 12,077,085 B2
(45) Date of Patent: Sep. 3, 2024

(54) MINED MATERIAL TRANSPORT VEHICLE

(71) Applicant: Komatsu Ltd., Tokyo (JP)

(72) Inventors: Masaaki Uetake, Tokyo (JP); Yuichi Kodama, Tokyo (JP); Kazunari Kawai, Tokyo (JP); Shinichi Terada, Tokyo (JP)

(73) Assignee: Komatsu Ltd., Tokyo (JP)

( * ) Notice: Subject to any disclaimer, the term of this patent is extended or adjusted under 35 U.S.C. 154(b) by 612 days.

(21) Appl. No.: 17/289,804

(22) PCT Filed: Oct. 30, 2019

(86) PCT No.: PCT/JP2019/042510
§ 371 (c)(1),
(2) Date: Apr. 29, 2021

(87) PCT Pub. No.: WO2020/095780
PCT Pub. Date: May 14, 2020

(65) Prior Publication Data
US 2021/0394659 A1    Dec. 23, 2021

(30) Foreign Application Priority Data

Nov. 9, 2018   (JP) ................................. 2018-211694

(51) Int. Cl.
*E21F 13/02*   (2006.01)
*B60P 1/36*   (2006.01)
(Continued)

(52) U.S. Cl.
CPC .................. *B60P 1/36* (2013.01); *B60P 3/00* (2013.01); *E21C 41/16* (2013.01); *E21F 13/02* (2013.01); *E21F 13/063* (2013.01)

(58) Field of Classification Search
CPC ......... E21F 13/025; E21F 13/063; B60P 1/36; B62D 33/027
(Continued)

(56) References Cited

U.S. PATENT DOCUMENTS 2,267,526 A    12/1941  Kutscha
2,326,444 A *  8/1943  Dudley ................. E21F 13/025
                                                    198/300
(Continued)

FOREIGN PATENT DOCUMENTS

AU    2015200488 A1    2/2015
CN    106740379 A      5/2017
(Continued)

*Primary Examiner* — Kaitlin S Joerger
(74) *Attorney, Agent, or Firm* — Locke Lord LLP

(57) ABSTRACT

A mined material transport vehicle includes: a vehicle main body capable of moving forward and rearward; and a loading platform provided on the vehicle main body, wherein the loading platform includes: a conveyor provided on the vehicle main body and having a conveying surface capable of conveying a mined material in a conveying direction extending in a forward-rearward directions; a pair of movable flaps that extend in the conveying direction on both sides in a vehicle width direction of the conveying surface, form a storage space together with the conveying surface, and are rotatable about lateral axial lines extending in the conveying direction; and lateral cylinders for rotating the movable flaps about the lateral axial lines.

20 Claims, 14 Drawing Sheets

(51) Int. Cl.
*B60P 3/00* (2006.01)
*E21C 41/16* (2006.01)
*E21F 13/06* (2006.01)

(58) Field of Classification Search
USPC .......................................................... 414/528
See application file for complete search history.

(56) References Cited

U.S. PATENT DOCUMENTS

| | | | | |
|---|---|---|---|---|
| 2,356,434 | A * | 8/1944 | Russell | E21F 13/025 |
| | | | | 198/514 |
| 4,160,619 | A * | 7/1979 | Nelson | E21F 13/025 |
| | | | | 414/501 |
| 4,291,777 | A * | 9/1981 | Yale | B62D 53/005 |
| | | | | 180/24.06 |
| 5,387,073 | A * | 2/1995 | Etherington | E21F 13/025 |
| | | | | 414/528 |
| 5,393,937 | A * | 2/1995 | Etherington | E21F 13/025 |
| | | | | 177/141 |
| 6,698,993 | B2 * | 3/2004 | Stephens | B65G 67/24 |
| | | | | 414/528 |
| 7,770,673 | B2 * | 8/2010 | Allen | B60L 53/80 |
| | | | | 180/68.5 |
| 7,899,599 | B2 | 3/2011 | Makela et al. | |
| 2003/0161709 | A1 * | 8/2003 | Musso, Jr. | B60P 1/36 |
| | | | | 414/528 |
| 2010/0116919 | A1 | 5/2010 | Yamada et al. | |
| 2014/0286739 | A1 * | 9/2014 | Helmsderfer | E01C 19/2045 |
| | | | | 414/528 |
| 2016/0215621 | A1 | 7/2016 | Kodama et al. | |

FOREIGN PATENT DOCUMENTS

| | | |
|---|---|---|
| JP | S54-033510 U | 3/1979 |
| JP | 2008-272681 A | 11/2008 |
| JP | 2010-184373 A | 8/2010 |
| JP | 2016-131032 A | 7/2016 |
| WO | 2015/046601 A1 | 4/2015 |
| WO | 2015/158199 A1 | 10/2015 |

* cited by examiner

MINED MATERIAL TRANSPORT VEHICLE

TECHNICAL FIELD

The present invention relates to a mined material transport vehicle. Priority is claimed on Japanese Patent Application No. 2018-211694, filed Nov. 9, 2018, the content of which is incorporated herein by reference.

BACKGROUND OF THE INVENTION

Patent Literature 1 describes a work machine used in a tunnel of a mine. The work machine includes a bucket for mining ore. The work machine transports the ore by moving along the tunnel in a state where the ore is held in the bucket.

Patent Literature 2 describes a mine mining system including a loading machine and a transport vehicle used in a mine tunnel. The loading machine stays at a mining site and mines ore. The transport vehicle transports the ore loaded from the loading machine to a dump site by traveling on a travel passage.

PRIOR ART DOCUMENT

Patent Document

[Patent Document 1] U.S. Pat. No. 7,899,599
[Patent Document 2] WO 2015/046601

SUMMARY OF THE INVENTION

Problem to be Solved by the Invention

In order to improve excavation efficiency, transportation of a large amount of ore at one time is required. However, since the size of a transport vehicle is limited by the cross-sectional area of a tunnel, it is not possible to increase the size of the transport vehicle without consideration. In addition, it is necessary to store ore having various shapes with large and small sizes at a high filling rate.

The present invention has been made in view of such a problem, and an object of the present invention is to provide a mined material transport vehicle capable of improving excavation efficiency.

Means for Solving the Problem

A mined material transport vehicle according to an aspect of the present invention includes: a vehicle main body capable of moving forward and rearward; and a loading platform provided on the vehicle main body, wherein the loading platform comprises: a conveyor provided on the vehicle main body and having a conveying surface extending to be capable of conveying a mined material in in forward-rearward directions; a pair of movable flaps extending in the conveying direction, that is, along the conveying surface, on both sides of the conveying surface in a vehicle width direction, forming a storage space together with the conveying surface, and being rotatable about an axial line extending in the conveying direction; and a drive unit configured to rotate the movable flaps about the axial line.

Effects of the Invention

According to the mined material transport vehicle of the above-described aspect, it is possible to improve excavation efficiency.

EMBODIMENTS OF THE INVENTION

Hereinafter, embodiments of the present invention will be described in detail with reference to the drawings.

Mined Material Transport Vehicle

A mined material transport vehicle 1 is a vehicle that is capable of traveling in a tunnel of a mine in a state in which a mined material is stored.

Figure 1:
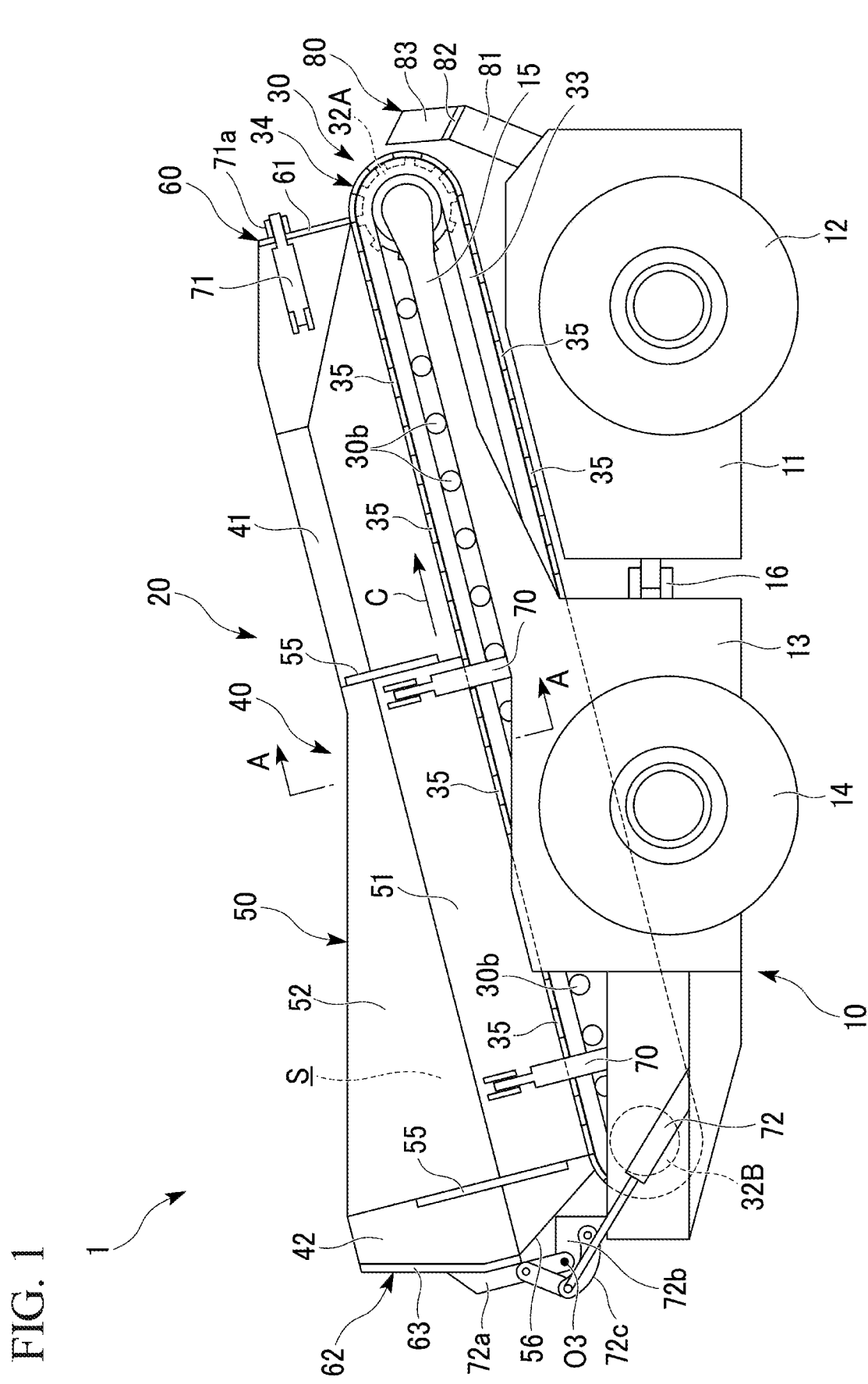
FIG. 1 is a side view of a mined material transport vehicle according to an embodiment of the present invention.

As shown in FIG. 1, the mined material transport vehicle 1 includes a vehicle main body 10, a loading platform 20, and a mined material guide 80.

Vehicle Main Body

The vehicle main body 10 is configured to be capable of moving forward and rearward in the tunnel of the mine in an extending direction of the tunnel, that is, be capable of traveling by shuttle. The vehicle main body 10 extends in the extension direction of the tunnel. The vehicle main body 10 includes a vehicle body front portion 11 and a vehicle body rear portion 13. The vehicle body front portion 11 and the vehicle body rear portion 13 are arranged so as to be adjacent to each other in forward-rearward directions. In the following description, the vehicle body front portion 11 side in the forward-rearward directions is referred to as a forward direction (one side in the forward-rearward directions, and a right side in FIG. 1 and FIG. 2), and the vehicle body rear portion 13 side is referred to as a rearward direction (the other side in the forward-rearward directions, and a left side in FIG. 1 and FIG. 2). The horizontal direction orthogonal to the forward-rearward directions is referred to as a vehicle width direction.

The vehicle body front portion 11 has a pair of front wheels 12 arranged at a distance from each other in the vehicle width direction. The vehicle body rear portion 13 has a pair of rear wheels 14 arranged at a distance from each other in the vehicle width direction.

The vehicle body front portion 11 and the vehicle body rear portion 13 are connected to each other in the forward-rearward directions by a connection portion 16 provided therebetween. The connection portion 16 connects the vehicle body front portion 11 and the vehicle body rear portion 13 to each other so as to be relatively rotatable to each other. That is, the vehicle body front portion 11 and the vehicle body rear portion 13 are configured so as to be capable of bending in the horizontal direction with the connection portion 16 serving as a joint. As a result, the vehicle main body 10 is a so-called articulated type.

The vehicle body rear portion 13 has a support bracket 15. The support bracket 15 extends from a front portion and an upper portion of the vehicle body rear portion 13 so as to be inclined upward toward the front side. A pair of the support brackets 15 are provided at a distance from each other in the vehicle width direction. Each front end of the support brackets 15 is positioned in the vicinity of a front end of each front wheel 12 in the vehicle body front portion 11.

Loading Platform

Figure 2:
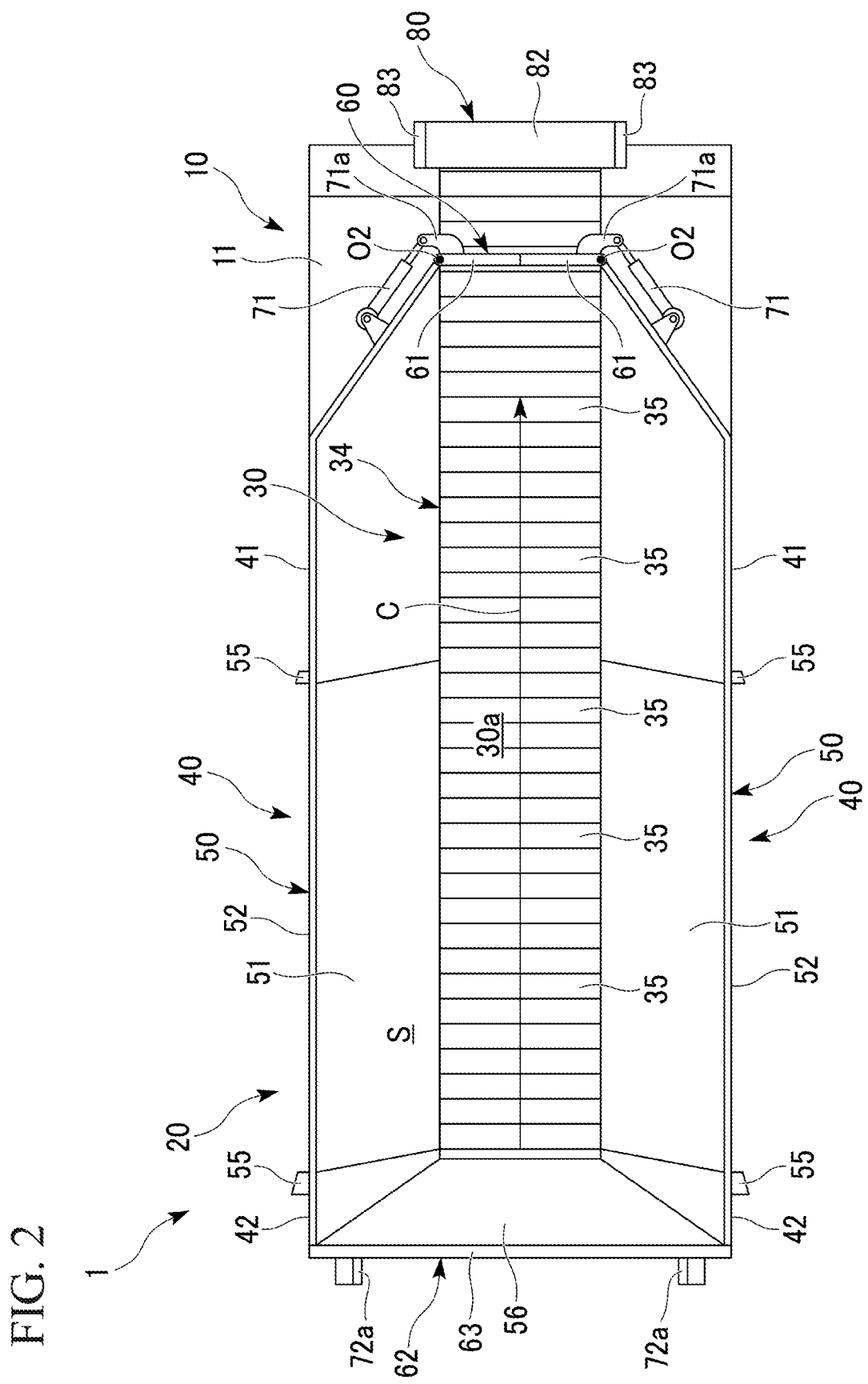
FIG. 2 is a plan view of the mined material transport vehicle according to the embodiment of the present invention.

As shown in FIG. 1 and FIG. 2, the loading platform 20 is provided on the vehicle main body 10. The loading platform 20 includes an apron feeder 30 (conveyor), lateral guides 40, a rear closing plate 56, a front gate 60 (opening-closing unit), a rear gate 62 (opening-closing unit), lateral cylinders 70 (drive unit), front cylinders 71, and rear cylinders 72.

Apron Feeder

The apron feeder 30 is supported on the vehicle body rear portion 13 of the vehicle main body 10. The apron feeder 30 is disposed on the vehicle main body 10 and extends across the forward-rearward directions. An upper surface of the apron feeder 30 is a conveying surface 30a. The conveying surface 30a extends in the forward-rearward directions. The conveying surface 30a of the present embodiment extends in a conveying direction C inclined with respect to the forward-rearward directions that extend in the horizontal direction. The conveying surface 30a is inclined so as to be high at a front side thereof and to be low at a rear side thereof. The conveying surface 30a is configured to be capable of conveying ore as the mined material in the conveying direction C. In the following description, a direction toward the forward side in the conveying direction C (a direction that has an ascending slope) is referred to as a conveying direction C forward side. A direction toward the rearward side in the conveying direction C (a direction that has a descending slope) is referred to as a conveying direction C rearward side.

The apron feeder 30 has a sprocket 32A, an idler 32B, a chain 33, and an apron 34. The sprocket 32A is supported so as to be sandwiched between the front ends of the pair of support brackets 15. The sprocket 32A is supported by the pair of support brackets 15 so as to be rotatable about an axial line extending in the vehicle width direction.

The idler 32B is supported at a rear portion of a vehicle body rear portion 13. The idler 32B is supported by the vehicle body rear portion 13 so as to be rotatable about an axial line extending in the vehicle width direction. The idler 32B is positioned below and at a rear side of the sprocket 32A that is disposed at a front. The sprocket 32A and the idler 32B are spaced apart from each other in the conveying direction C.

The chain 33 is formed in an endless shape with the conveying direction C being a longitudinal direction. The chain 33 is wound, at both ends in the conveying direction C, around the sprocket 32A and the idler 32B, and thus, a rotation of the sprocket 32A is transmitted to the chain 33.

The apron 34 is constituted by a large number of plates 35. Each of the plates 35 has a rectangular plate shape with the vehicle width direction being a longitudinal direction. The apron 34 is formed in an endless shape similarly to the chain 33 by connecting the large number of plates 35 in a direction along a plate surface thereof. The apron 34 is provided so as to accommodate the chain 33, the sprocket 32A, and the idler 32B inside of the apron 34 and to be wound around the sprocket 32A and the idler 32B similarly to the chain 33. The apron 34 is fixed to the chain 33 over the entire circumference thereof. Thus, the apron 34 is driven along with the driving of the chain 33.

An upper surface of the apron 34 is the above-described conveying surface 30a. By a positive rotation of the sprocket 32A, the conveying surface 30a conveys the mined material to the conveying direction C forward side. By a negative rotation of the sprocket 32A, the conveying surface 30a conveys the mined material to the conveying direction C rearward side. A plurality of rollers 30b that are capable of guiding each plate 35 in the conveying direction C via the chain 33 are provided in the inner side of the apron 34.

Lateral Guide

As shown in FIG. 1 and FIG. 2, a pair of lateral guides 40 is provided on both sides of the conveying surface 30a in the vehicle width direction. The lateral guides 40 extend in the conveying direction C. The lateral guides 40 are provided so as to sandwich a space above the conveying surface 30a from both sides in the vehicle width direction. A storage space S capable of storing the mined material is defined by the pair of lateral guides 40 and the conveying surface 30a.

The lateral guides 40 include front fixed guides 41, rear fixed guides 42, movable flaps 50, and flap guides 55.

Front Fixed Guide

The front fixed guides 41 are provided on both sides in the vehicle width direction in a front portion of the conveying surface 30a.

The front fixed guides 41 extend upward toward an outer side in the vehicle width direction. The front fixed guides 41 are fixed to the support brackets 15 via a support member (not shown).

The front fixed guides 41 are immovably fixed without changing their posture.

The front portions of the pair of front fixed guides 41 extend toward the front end so as to approach each other toward an inner side in the vehicle width direction, in planar view. The front ends of the pair of front fixed guides 41 are positioned on the rear side of the front end of the conveying surface 30a. That is, the conveying surface 30a protrudes in the conveying direction C forward side from the front fixed guides 41.

Rear Fixed Guide

The rear fixed guides 42 are provided on both sides in the vehicle width direction in the rear portion of the conveying surface 30a.

The rear fixed guides 42 are disposed in the conveying direction C rearward side of the front fixed guides 41 at a distance from the front fixed guides 41. The rear fixed guides 42 extend upward while extending toward the outer side in the vehicle width direction. The rear fixed guides 42 are fixed to the vehicle body rear portion 13 via a support member (not shown). The rear fixed guides 42 are immovably fixed without changing their posture, similar to the front fixed guides 41.

Movable Flap

Figure 3:
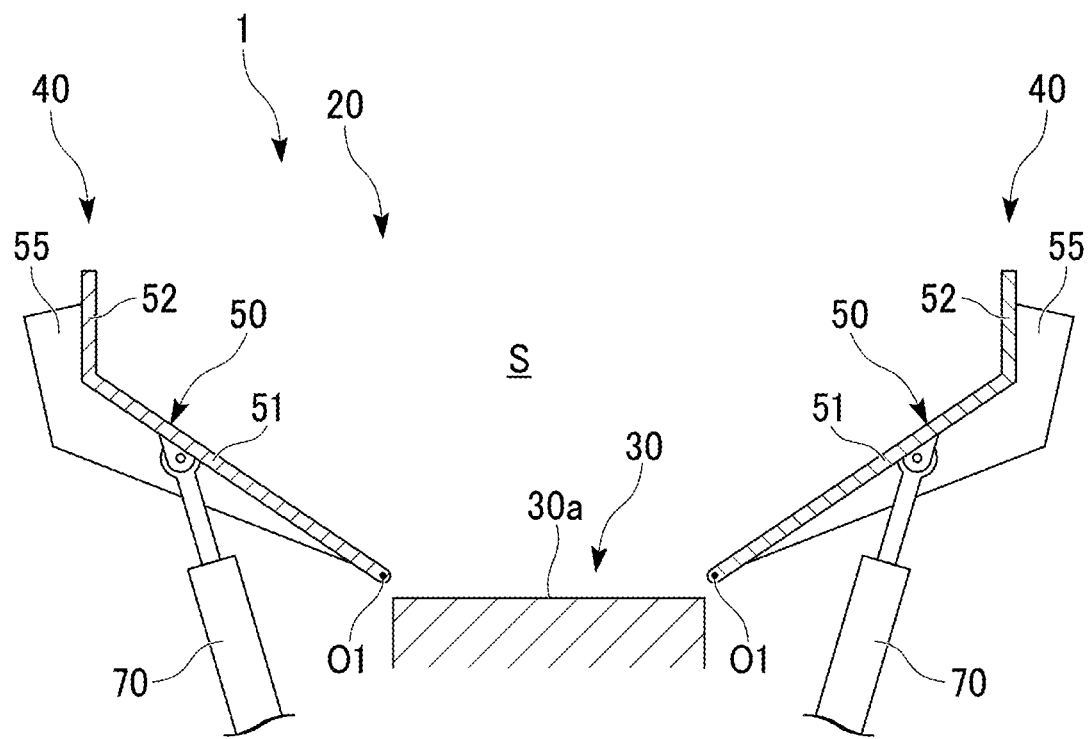
FIG. 3 is a cross-sectional view taken along line A-A in FIG. 1, illustrating a state in which movable flaps are located at a first position.
Figure 4:
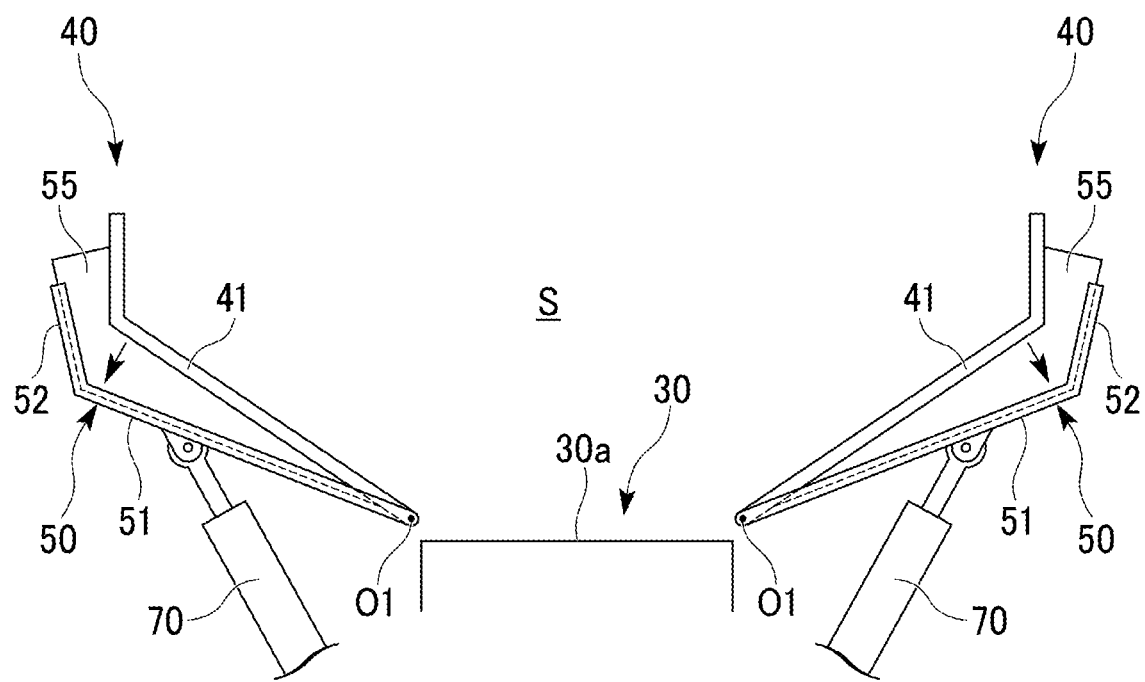
FIG. 4 is a cross-sectional view taken along line A-A in FIG. 1, illustrating a state in which the movable flaps are located at a second position.

A pair of movable flaps 50 is provided on both sides in the width direction of the conveying surface 30a so as to be positioned between the front fixed guides 41 and the rear fixed guides 42. As shown in FIG. 3 and FIG. 4, each movable flap 50 includes an inclined plate 51 and a rising plate 52.

The inclined plate 51 constitutes a lower portion of the movable flap 50. The inclined plate 51 has a flat plate shape extending obliquely upward from a lower end toward the outer side in the vehicle width direction. The inclined plate 51 extends in the conveying direction C. An upper end of the inclined plate 51 extends parallel to the conveying direction C.

A rising portion has a flat plate shape extending upward from an upper end of the inclined plate 51 so as to rise upward. The rising portion has a shape in which a size of a rising from the upper end of the inclined plate 51 increases toward the conveying direction C rearward side.

A lower end of the movable flap 50, that is, the lower end of the inclined plate 51 is provided so as to be rotatable about a lateral axial line O1 extending in the conveying direction C on both sides in the vehicle width direction. In the present embodiment, the lower ends of the movable flaps 50 are each supported to the corresponding front fixed guide 41 and the corresponding rear fixed guide 42 so as to be rotatable about the corresponding lateral axial line O1 by being each supported by a shaft (not shown) provided at the corresponding lower ends of the front fixed guide 41 and the rear fixed guide 42. That is, each movable flap 50 extends from the lateral axial line O1 toward the outside in the radial direction of the lateral axial line O1.

Each movable flap 50 is rotatable about the lateral axial line O1 between a first position and a second position.

As shown in FIG. 3, the first position is a position at which the rising portion of the movable flap 50 extends in a vertical direction. The first position is a position where the front end of the movable flap 50 is continuous with the rear end of the front fixed guide 41 and the rear end of the movable flap 50 is continuous with the front end of the rear fixed guide 42. Inner surfaces of the movable flap 50 at the first position, the front fixed guide 41, and the rear fixed guide 42 form a guide surface that is continuous over the conveying direction C.

As shown in FIG. 4, the second position is a position in which the movable flap 50 is rotated about the lateral axial line O1 toward the outer side in the vehicle width direction from the first position. The second position is a position in which the front end of the movable flap 50 is positioned at the outer side in the vehicle width direction of the rear end of the front fixed guide 41, and the rear end of the movable flap 50 is positioned at the outer side in the vehicle width direction of the front end of the rear fixed guide 42. By the movable flap 50 transitioning from the first position to the second position, the inner surface of the movable flap 50 becomes discontinuous with the inner surface of the front fixed guide 41 and the inner surface of the rear fixed guide 42.

Flap Guide

The flap guides 55 are members that cover, from both sides in the conveying direction C, a rotation range of the movable flaps 50 that rotate between the first position and the second position. The rotation range has a fan shape when viewed from the conveying direction C.

The flap guide 55 is provided on each of the front fixed guide 41 and the rear fixed guide 42 on both sides in the vehicle width direction. The flap guide 55 fixed to the front fixed guide 41 is provided so as to protrude to the outer side in the vehicle width direction from the rear end of the front fixed guide 41, as shown in FIG. 1, FIG. 3 and FIG. 4. The flap guide 55 protrudes so as to overlap with a movable range of the flap guide 55 when viewed from the vehicle width direction. That is, the flap guide 55 has a fan shape that covers the rotation range from the conveying direction C.

The flap guide 55 fixed to the rear fixed guide 42 is provided so as to protrude to the outer side in the vehicle width direction from the front end of the rear fixed guide 42, as shown in FIG. 1. The flap guide 55 also protrudes so as to overlap with the movable range of the flap guide 55 when viewed from the vehicle width direction.

The flap guide 55 may be configured to come into sliding contact with the end portion of the movable flap 50 in the conveying direction C when the movable flap 50 rotates.

Rear Closing Plate

As shown in FIG. 1 and FIG. 2, the rear closing plate 56 covers the lower portion of the rear end of the storage space S from the conveying direction C rearward side. Both ends of the rear closing plate 56 in the vehicle width direction are connected to lower portions of rear ends of the pair of rear fixed guides 42 over the vertical direction. A lower end of the rear closing plate 56 is provided so as to face the conveying surface 30a from above. The rear closing plate 56 is inclined so as to extend toward the rear side while extending upward. An upper end of the rear closing plate 56 is positioned lower than upper ends of the rear fixed guides 42. As a result, the upper end of the rear closing plate 56 and the rear ends of the rear fixed guides 42 form an introduction opening through which the mined material is introduced into the storage space S.

Rear Gate

Figure 5:
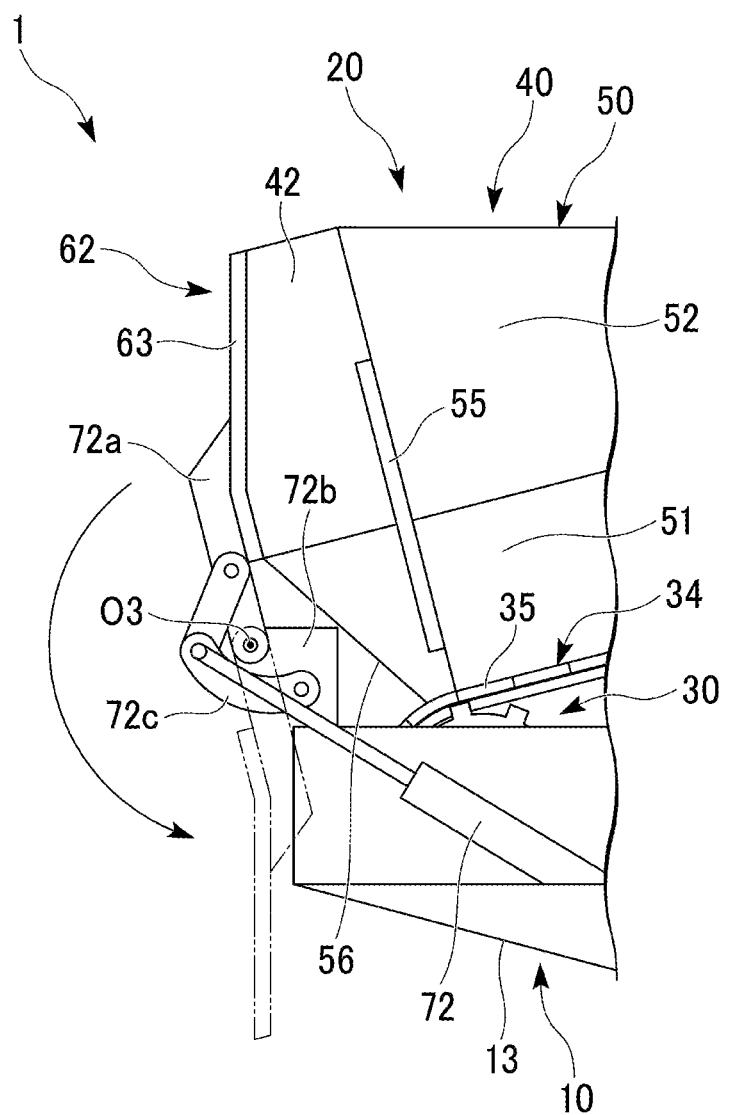
FIG. 5 is a partially enlarged view of FIG. 1.

As shown in FIG. 1 and FIG. 5, the rear gate 62 is provided at the introduction opening of the mined material, which is an opening on the conveying direction C rearward side in the storage space S. The rear gate 62 has a rear opening-closing plate 63 that closes the introduction opening from the conveying direction C rearward side. A lower end of the rear opening-closing plate 63 is in contact with the upper end of the rear closing plate 56 over the vehicle width direction and has a plate shape in which both ends in the vehicle width direction are connected to the rear ends of the pair of rear fixed guides 42.

A pair of ribs 72a projecting rearward and extending in the vertical direction are provided on a surface of the rear opening-closing plate 63 facing rearward at a distance from each other in the vehicle width direction. A bracket 72b is provided on a rear end-upper surface of the vehicle body rear portion 13. A rear end of the rib 72a is rotatable about a rear axial line O3 extending in the vehicle width direction with respect to the bracket 72b. As a result, the rear opening-closing plate 63 integrally fixed to the rib 72a is rotatable rearward and downward from a closing position at which the rear opening-closing plate 63 closes the introduction opening. A position at which the introduction opening is opened by the rotation of the rear opening-closing plate 63 from the closing position is defined as an opening position.

Front Gate

Figure 6:
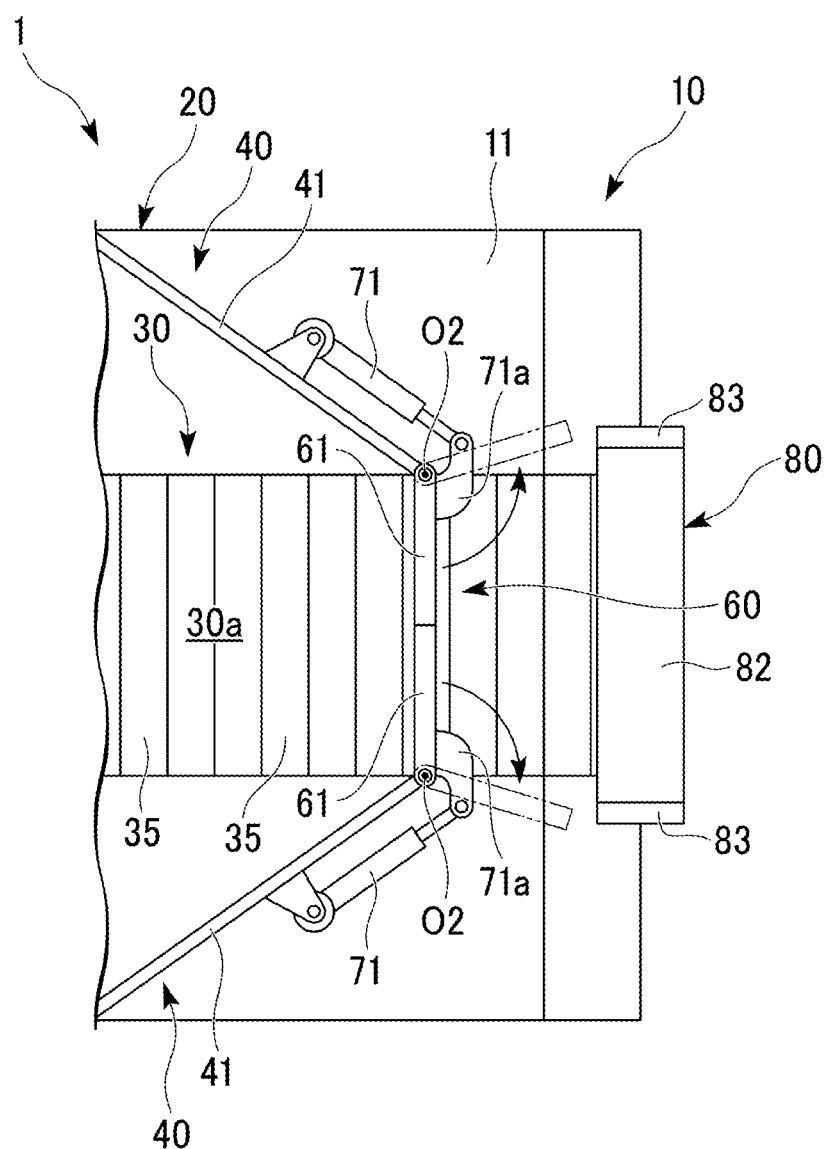
FIG. 6 is a partially enlarged view of FIG. 2.

As shown in FIG. 2 and FIG. 6, the front gate 60 is provided at an opening of the storage space S on the conveying direction C forward side. The front gate 60 has a pair of front opening-closing plates 61. The pair of front opening-closing plates 61 are arranged side by side in the vehicle width direction. Each of the pair of front opening-closing plates 61 has a plate shape extending in a direction orthogonal to the conveying surface 30a. Each of the pair of front opening-closing plates 61 is connected to the front end of the front fixed guide 41 so as to be rotatable about a front axial line O2 orthogonal to the conveying surface 30a.

The pair of front opening-closing plates 61 is rotatable between a closing position and an opening position. The closing position is a position at which the pair of opening-closing plates extends toward the inner side in the vehicle width direction from a first rotation axial line and closes the storage space S from the conveying direction C forward side. The opening position is a position at which the pair of opening-closing plates rotates from the closing position toward the front side to open the storage space S to the conveying direction C forward side.

That is, similarly to the rear opening-closing plates 63, the front opening-closing plates 61 are provided so as to be rotatable between an opening position at which the storage space S is opened and a closed position at which the storage space S is closed.

Lateral Cylinder

As shown in FIG. 1, FIG. 3, and FIG. 4, two lateral cylinders 70 are each provided on both sides in the vehicle width direction so as to be separated from each other in the conveying direction C.

The lower end of each lateral cylinder 70 is connected to the vehicle rear portion, and the upper end of each lateral cylinder 70 is connected to the outer surface of the inclined plate 51 in each movable flap. The lateral cylinder 70 is configured to expand and contract by supplying and discharging operating oil to and from the inside thereof. By the expansion and contraction of the lateral cylinder 70, the movable flap 50 is rotationally driven about the lateral axial line O1 between the first position and the second position.

Front Cylinder

As shown in FIG. 1, FIG. 2, and FIG. 6, a pair of front cylinders 71 are provided on both sides in the vehicle width direction at the front portion of the loading platform 20. The rear end of the front cylinder 71 is connected to the outer surface of the front fixed guide 41, and the front end of the front cylinder 71 is connected to the front surface of the front opening-closing plate 61 via a bracket 71a. The front cylinder 71 is configured to expand and contract by operating oil in the same manner as the lateral cylinder 70. By the expansion and contraction of the lateral cylinder 70, the pair of front opening-closing plates 61 is rotationally driven between the opening position and the closing position.

Rear Cylinder

As shown in FIG. 1, FIG. 2, and FIG. 5, a pair of rear cylinders 72 are provided on both sides in the vehicle width direction at the rear portion of the loading platform 20. A lower end of each rear cylinder 72 is connected to the vehicle body rear portion 13. The upper end of the cylinder is connected to a link connecting the rib 72a and the bracket 72b. Each rear cylinder 72 is configured to expand and contract by operating oil in the same manner as the front cylinders 71 and the lateral cylinders 70. By the expansion and contraction of the rear cylinders 72, the rear opening-closing plate 63 is rotationally driven between the opening position and the closing position. cl Mined Material Guide As shown in FIG. 1 and FIG. 2, the mined material guide 80 is provided at the front end of the vehicle body front portion 11 of the vehicle main body 10. The mined material guide 80 guides forward the mined material, which falls from the end portion of the conveying surface 30a of the conveying direction C forward side. The mined material guide 80 includes a support portion 81, a lateral plate 82, and vertical plates 83.

The support portion 81 extends upward from the front portion and the upper portion of the vehicle body front portion 11. In the present embodiment, the support portion 81 extends so as to be inclined with respect to the vertical direction toward the forward side while extending upward.

The lateral plate 82 is fixed on an upper end of the support portion 81. The lateral plate 82 has a rectangular plate shape with the vehicle width direction being a longitudinal direction. A plate surface of the lateral plate 82 facing upward serves as a guide surface. The guide surface extends along a front end of the apron feeder 30 in planar view. The guide surface is positioned below an end portion of the conveying surface 30a on the conveying direction C forward side in planar view. The guide surface extends so as to be inclined downward toward the front side. Here, a height of the front end of the guide surface of the lateral plate 82 is positioned above a lower edge of the introduction opening of the rear end in the loading platform 20. The front end of the guide surface of the lateral plate 82 is positioned at a front of the front end of the vehicle body front portion 11.

A pair of vertical plate portions 83 is provided so as to rise upward from the end portions on both sides in the vehicle width direction of the lateral plate 82.

Drive System

Figure 7:
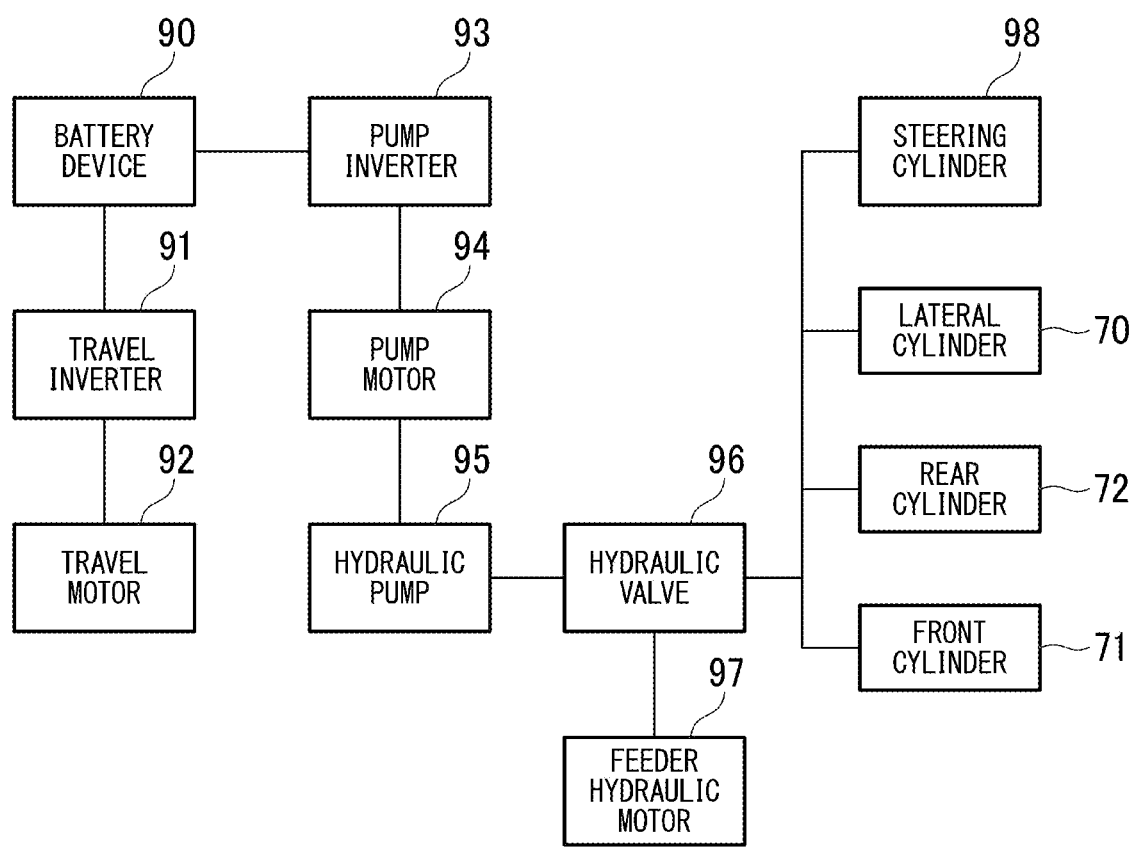
FIG. 7 is a block diagram of an electro-hydraulic system of the mined material transport vehicle according to the embodiment of the present invention.

Next, a drive system of the mined material transport vehicle 1 will be described with reference to FIG. 7. The mined material transport vehicle 1 includes, as a drive system, a battery device 90, a travel inverter 91, a travel motor 92, a pump inverter 93, a pump motor 94, a hydraulic pump 95, a hydraulic valve 96, and a feeder hydraulic motor 97, which are provided in the vehicle main body 10.

The battery device 90 has a large number of batteries. The mined material transport vehicle 1 is operated by electric power from the batteries. The battery device 90 is provided with a battery control unit that controls a supply destination of the electric power of the batteries.

The travel inverter 91 converts the direct-current electric power supplied from the battery device 90 into alternating-current electric power. The travel motor 92 is rotationally driven by the alternating-current electric power supplied from the travel inverter 91. The front wheels 12 and the rear wheels 14 are rotationally driven by the rotation of the travel motor 92, so that the vehicle main body 10 moves forward and rearward. The travel inverter 91 is controlled by a control unit (not shown), so that the vehicle main body 10 moves forward or rearward.

The pump inverter 93 converts the direct-current electric power supplied from the battery device 90 into alternating-current electric power. The pump motor 94 is rotationally driven by the alternating-current electric power from the pump inverter 93. The hydraulic pump 95 is rotationally driven by the rotation of the pump motor 94 to apply pressure to operating oil supplied from an oil tank (not shown) and discharge the operating oil. The hydraulic valve 96 is controlled by a control unit (not shown) to appropriately distribute the operating oil supplied from the hydraulic pump 95 to the lateral cylinder 70, the rear cylinder 72, the front cylinder 71, the feeder hydraulic motor 97, and the steering cylinder 98. The feeder hydraulic motor 97 is rotationally driven by the operating oil. The sprocket 32A of the apron feeder 30 is driven to perform a positive rotation or a negative rotation by the rotation of the feeder hydraulic motor 97.

Operation and Effects

Figure 8:
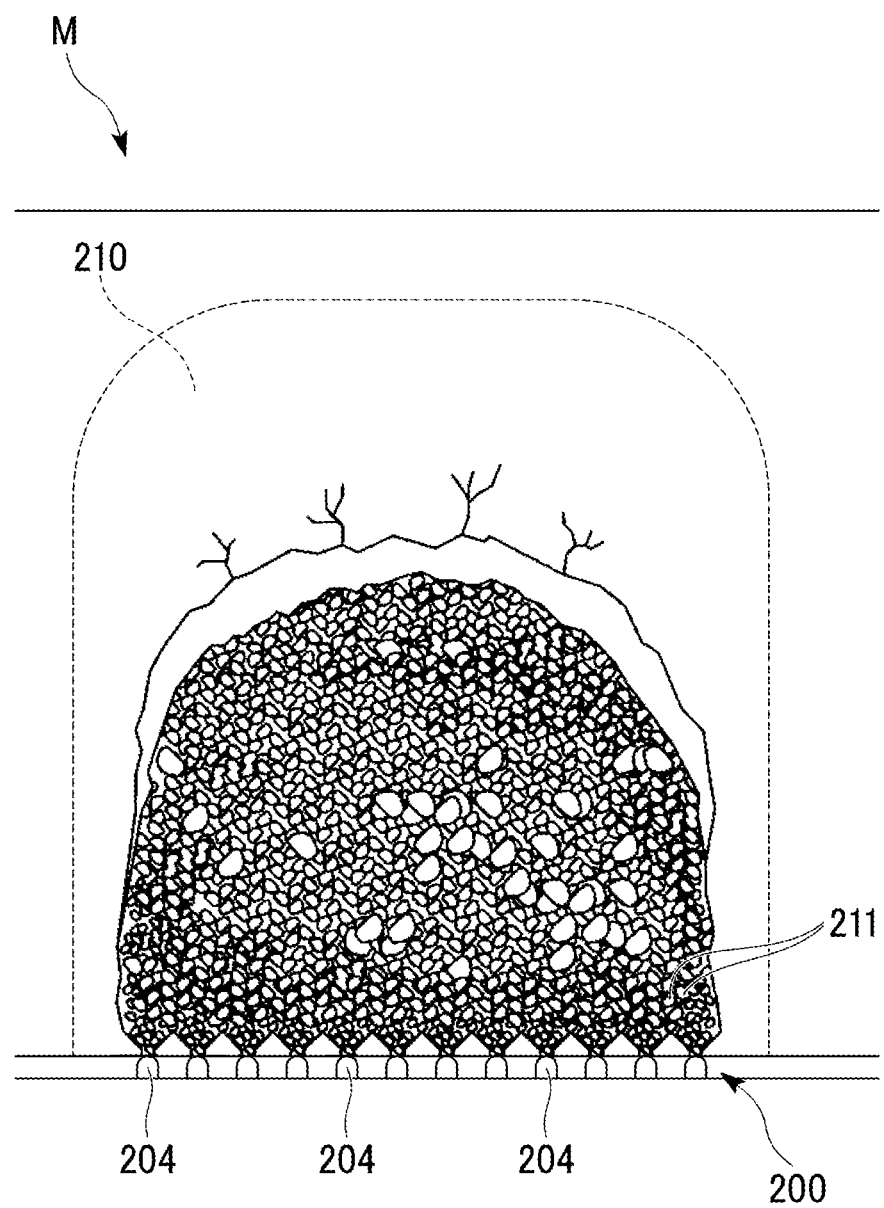
FIG. 8 is a schematic vertical cross-sectional view of a mine in which the mined material transport vehicle according to the embodiment of the present invention is used.

As shown in FIG. 8, the mined material transport vehicle 1 having the above-described configuration is used in a mine M that mines ore by a block caving method. When the ore 211 is mined by the block caving method, a footprint 200 as a tunnel is formed below an ore deposit 210 (ore body) of the mine M. The footprint 200 is a stratum that serves as a production level. Holes are formed upward at an undercut level that is a stratum above the production level, and a lower portion of an ore body 2 is blasted (undercut) through the holes. As a result, the ore body 2 naturally collapses due to its own weight, and the ore 211 as a mined material falls onto a draw bell of the footprint 200. An area where the ore 211 falls becomes a mining site 204. As the ore 211 is mined at the mining site 204, the natural collapse of the ore body 210 spreads up to an upper portion of the ore body 210. Accordingly, the ore 211 can be continuously mined.

Figure 9:
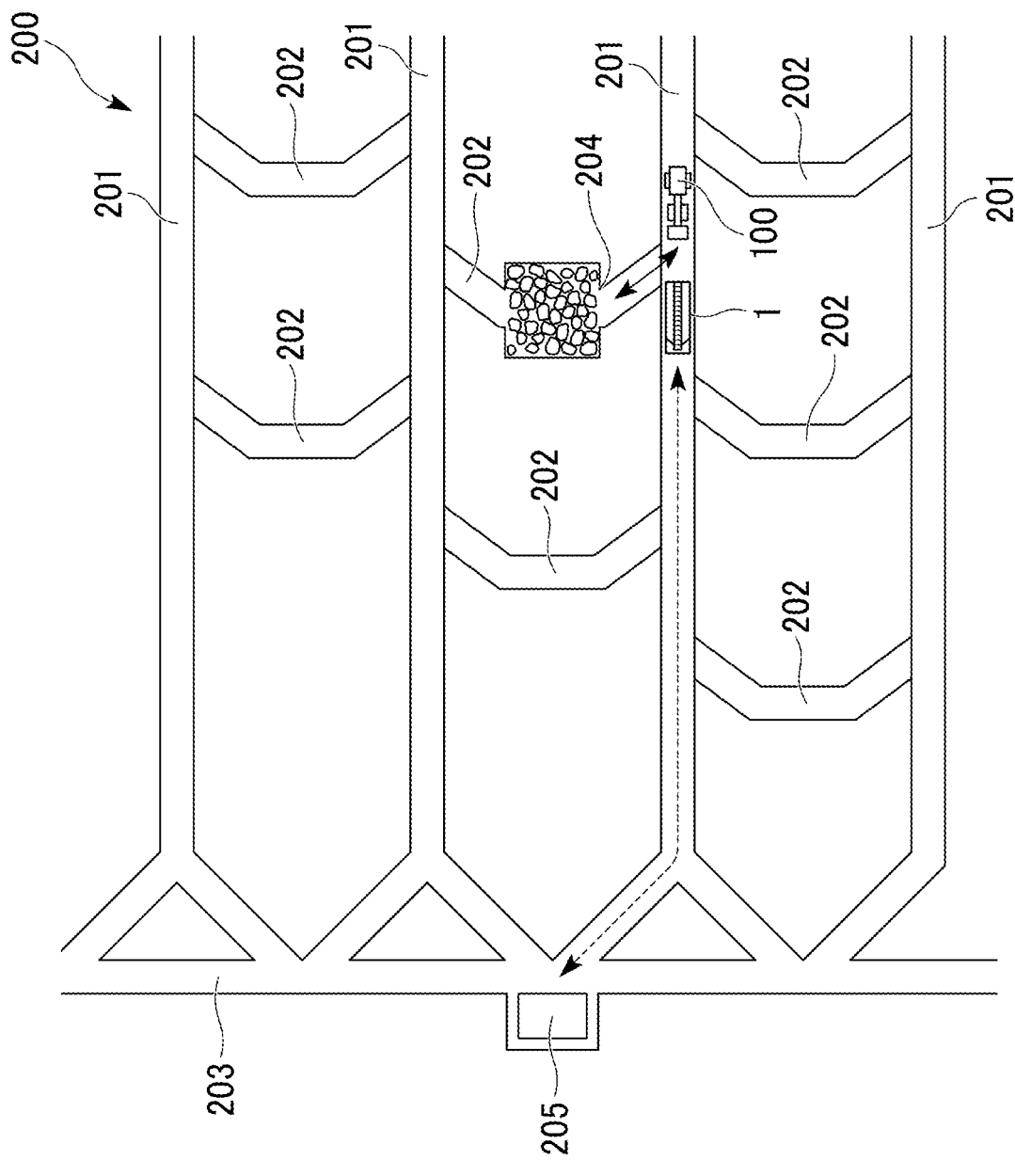
FIG. 9 is a plan view illustrating a first mode of use of the mined material transport vehicle according to the embodiment of the present invention.

As shown in FIG. 9, the footprint 200 is formed with a plurality of drifts 201 extending at intervals from each other and a plurality of crosscuts 202 extending at intervals from each other so as to cross the drifts 201. Further, an outer peripheral passage 203 connecting the drifts 201 as the footprint 200 is formed at an end portion of the plurality of drifts 201. The end portion of each of the drifts 201 is branched into two branches and connected to the outer peripheral passage 203.

A mining site 204 of ore is formed in each of the crosscuts 202. The mining site 204 is formed by performing the above-described undercut in the entire region of the undercut level, which is a stratum above the crosscut 202 positioned at the production level. The outer peripheral passage 203 is provided with a dump site 205 for discharging mined ore (mined material).

For example, as one operation, as illustrated in FIG. 9, mining and transportation of ore are carried out by one loading vehicle 100 and one mined material transport vehicle 1. The footprint 200 in FIGS. 9 to 12 is a so-called herringbone type. In FIG. 9 and the following FIGS. 10 to 13, a movement trajectory of the loading vehicle 100 is indicated by a solid line, and a movement trajectory of the mined material transport vehicle 1 is indicated by a broken line.

Mining of the ore is carried out by the loading vehicle 100 (load haul dump machine). The loading vehicle 100 has a bucket at a front portion thereof, enters the crosscut 202, and scoops up the ore by the bucket. Then, the loading vehicle 100 moves from the crosscut 202 onto the drift 201 by swinging while moving backward from the mining site 204. Accordingly, on the drift 201 of the herringbone type footprint 200, the loading vehicle 100 is in a posture in which the bucket whose equipped direction indicates a forward direction is directed toward the outer peripheral passage 203 side having the dump site 205.

At this time, the mined material transport vehicle 1 stands by in front of the loading vehicle 100 on the drift 201. The mined material transport vehicle 1 is positioned on the drift 201 in a posture in which a front side in a traveling direction faces the dump site 205 side and a rear side in the traveling direction faces the loading vehicle 100 side. In this state, when the rear gate 62 of the mined material transport vehicle 1 is opened, the ore is loaded by the loading vehicle 100 into the storage space S from the rear of the mined material transport vehicle 1 through the introduction opening. Since the conveying surface 30a partitioning the storage space S from below is inclined so as to be positioned lower toward the rearward side, it is possible to easily load the ore by the loading vehicles 100.

The ore introduced into the storage space S directly falls onto the conveying surface 30a, or falls onto the conveying surface 30a by being guided downward and to the inner side in the vehicle width direction by the lateral guides 40.

When the sprocket 32A of the apron feeder 30 of the mined material transport vehicle 1 performs a positive rotation, the ore located on the conveying surface 30a is conveyed in the conveying direction C forward side by the conveying surface 30a. As a result, a space into which the ore is newly loaded is formed in the rear portion of the conveying surface 30a. Since the front gate 60 closes the storage space S from the front side, the ore does not spill from the front end of the conveying surface 30a.

The movable flaps 50 of the lateral guides 40 are rotated by the lateral cylinders 70, so that it is possible to drop the ore staying on the inner surface of the lateral guides 40 to the conveying surface 30a. Thus, it is possible to smoothly convey the ore introduced into the storage space S to the conveying direction C forward side. In addition, there are various shapes of ore. Therefore, even in a case where a large lump of ore is introduced, or even in a case where, in the storage space S, ore is caught without falling on the conveying surface 30a, it is possible to promote the falling of the ore on the conveying surface 30a by vibrating the ore by the rotation of the movable flaps 50.

Further, since the flap guides 55 that cover the rotation range of the movable flaps 50 are provided on both sides of the movable flaps 50 in the conveying direction C, a large gap that allows the storage space S to communicate with the outside is not formed between the movable flaps 50 and the front fixed guides 41 and between the movable flaps 50 and the rear fixed guides 42. Therefore, it is possible to avoid the fall of ore from the above gap.

Since a space is formed in the rear portion of the storage space S, it is possible to carry out loading of ore by the loading vehicle 100 a plurality of times. In addition, it is possible to increase the filling rate of ore in the storage space S, and it is possible to efficiently perform mining and transport of ore.

After ore is sufficiently filled in the storage space S, the rear gate 62 is closed. Thus, it is possible to prevent the ore from spilling out from the rear side of the storage space S. In this state, the mined material transport vehicle 1 moves forward in the drift 201 and moves to the dump site 205 on the outer peripheral passage 203. At the dump site 205, the front gate 60 is opened and the sprocket 32A performs a positive rotation to cause the ore on the conveying surface 30a to fall from the front end of the apron feeder 30. The fallen ore is guided to the front side by the guide surface of the mined material guide 80 and falls onto the dump site 205. In this case as well, by rotating the movable flaps 50, it is possible to smoothly discharge ore from the storage space S.

After the discharge of ore is completed, the mined material transport vehicle 1 moves backward to the loading position by the loading vehicle 100. Then, the loading of ore by the loading vehicle 100 is performed again.

Here, if an operation is performed in which mining of ore and transportation of ore to the dump site 205 are performed only by the loading vehicle 100, particularly when the travel distance to the dump site 205 is long, productivity significantly reduces. In the present embodiment, since the loading vehicle 100 is dedicated to mining and loading to the mined material transport vehicle 1 and the transport of the mined material to the dump site 205 is performed by the mined material transport vehicle 1, it is possible to improve productivity.

In addition, the mined material transport vehicle 1 can store ore at a high filling rate by the conveying surface 30a and the movable flaps 50. Therefore, it is possible to transport a large amount of ore to the dump site 205 at one time in spite of being subjected to the restrictions on the cross-sectional shape of the tunnel. As a result, productivity can be further improved.

Figure 10:
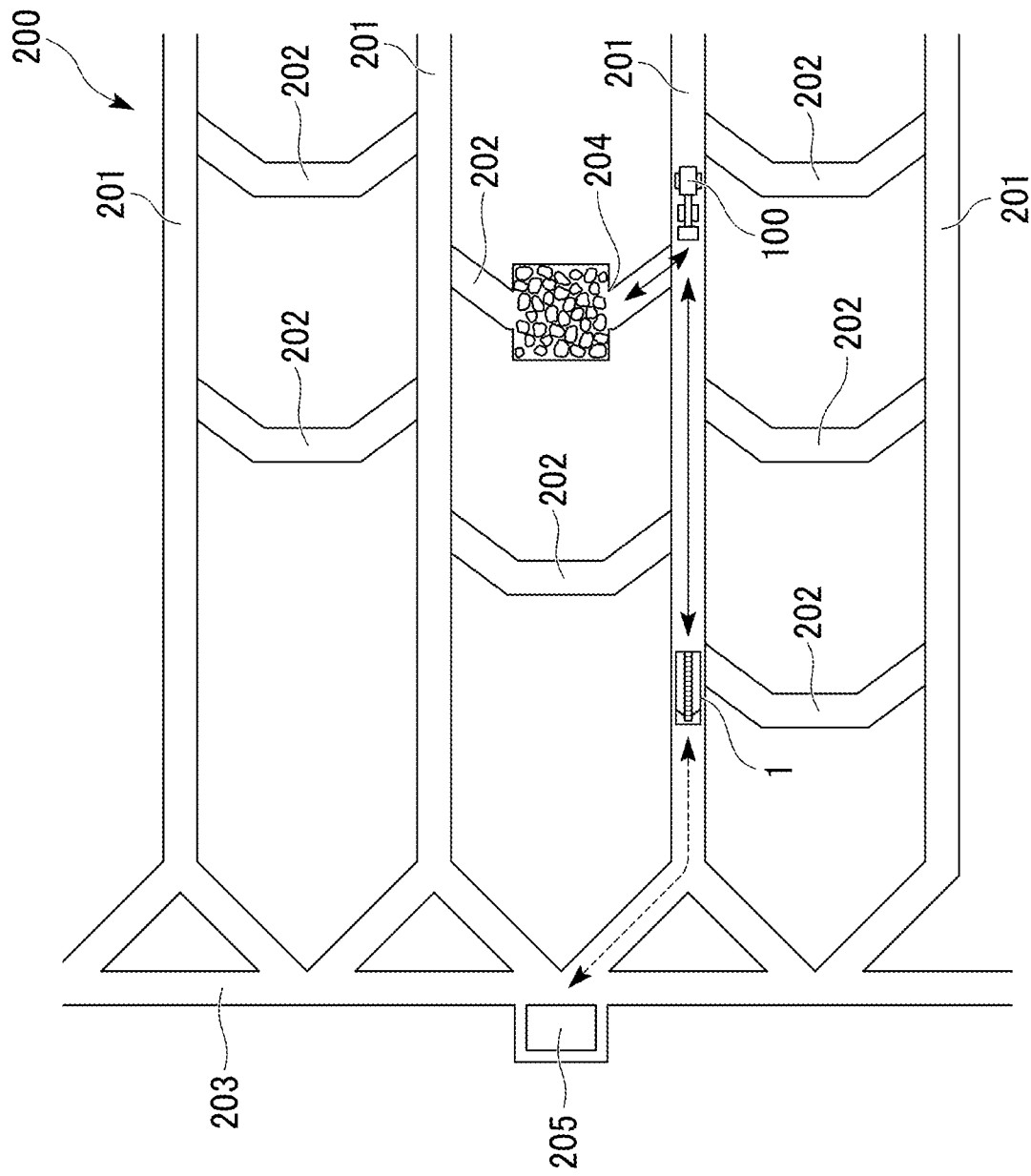
FIG. 10 is a plan view illustrating a second mode of use of the mined material transport vehicle according to the embodiment of the present invention.

Instead of the above-described operation, for example, as shown in FIG. 10, an operation may be performed in which the loading vehicle 100 travels on the drift 201 toward the dump site 205 in a state in which the loading vehicle 100 stores ore in the bucket without being dedicated to the mining and loading of ore and ore is loaded into the mined material transport vehicle 1 on the way.

Figure 11:
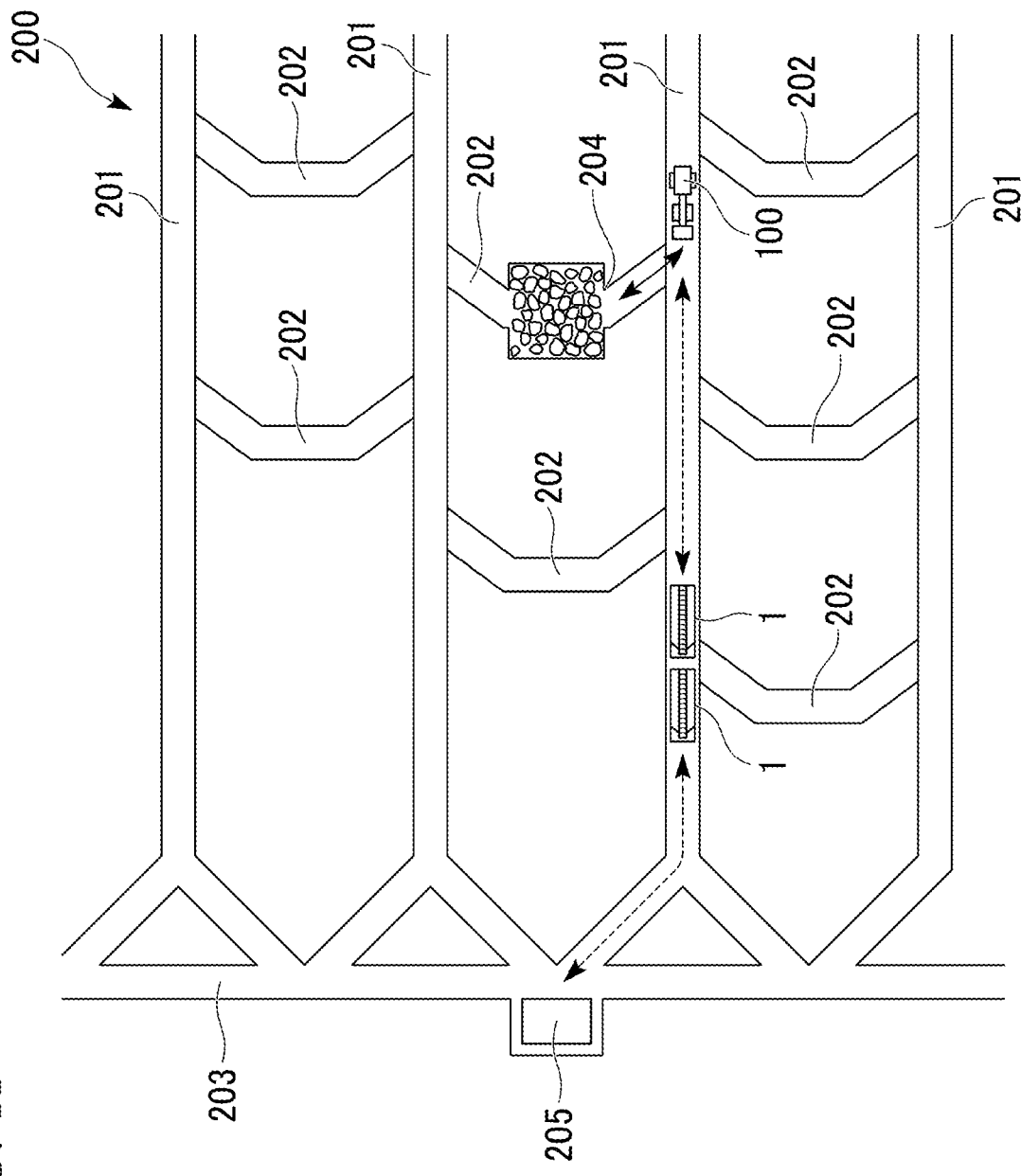
FIG. 11 is a plan view illustrating a third mode of use of the mined material transport vehicle according to the embodiment of the present invention.

In addition, for example, as shown in FIG. 11, an operation may be performed in which, after the loading vehicle 100 dedicated to mining ore loads ore on the first mined material transport vehicle 1 (the mined material transport vehicle 1 on the right side in FIG. 11), the first mined material transport vehicle 1 travels to some extent, and then the first mined material transport vehicle 1 transfers the ore to the second mined material transport vehicle 1 (the mined material transport vehicle 1 on the left side in FIG. 11). The second mined material transport vehicle 1 transports and discharges the transferred ore to the dump site 205.

In this case, the second mined material transport vehicle 1 is in a posture facing the dump site 205 side similar to the first mined material transport vehicle 1. When the first mined material transport vehicle 1 arrives at the rear side of the second mined material transport vehicle 1, the rear gate 62 of the second mined material transport vehicle 1 is opened, and the front gate 60 of the first mined material transport vehicle 1 is opened.

In this state, when ore is discharged from the front end of the first mined material transport vehicle 1, the ore falls from the front end of the conveying surface 30a and is guided forward via the mined material guide 80. At this time, since the guide surface of the mined material guide 80 is positioned higher than the lower edge of the rear gate 62, ore is introduced into the storage space S of the second mined material transport vehicle 1 via the guide surface.

Since the mined material transport vehicle 1 is inclined so that the front side of the conveying surface 30a becomes high, and has the mined material guide 80, it is possible to smoothly transfer ore between the mined material transport vehicles 1.

Figure 12:
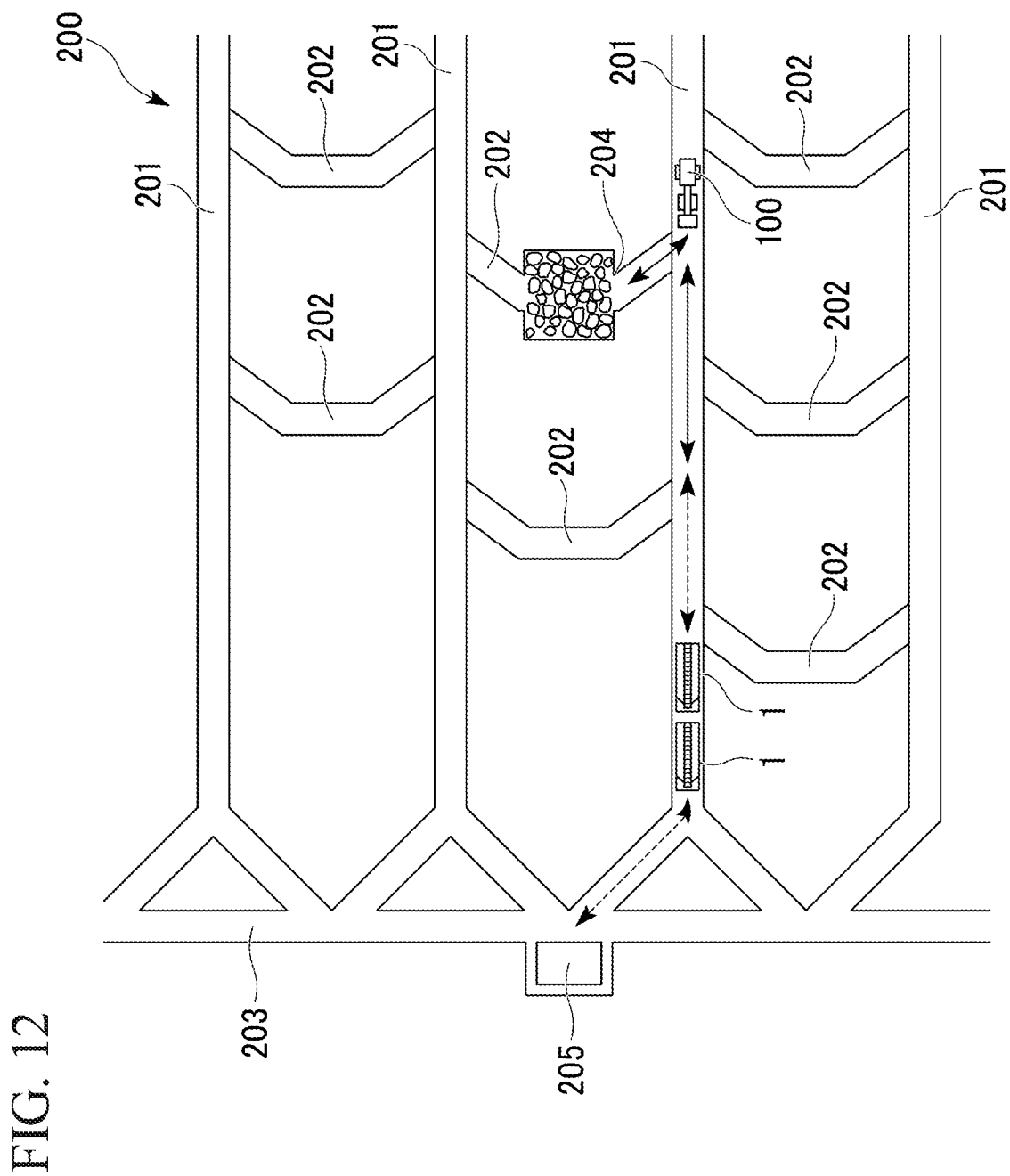
FIG. 12 is a plan view illustrating a fourth embodiment of the mined material transport vehicle according to the embodiment of the present invention.

Further, for example, as shown in FIG. 12, an operation may be performed in which the loading vehicle 100 travels toward the dump site 205 in a state in which ore is stored in the bucket, and then the ore is transported to the dump site 205 via the first mined material transport vehicle 1 and the second mined material transport vehicle 1.

Figure 13:
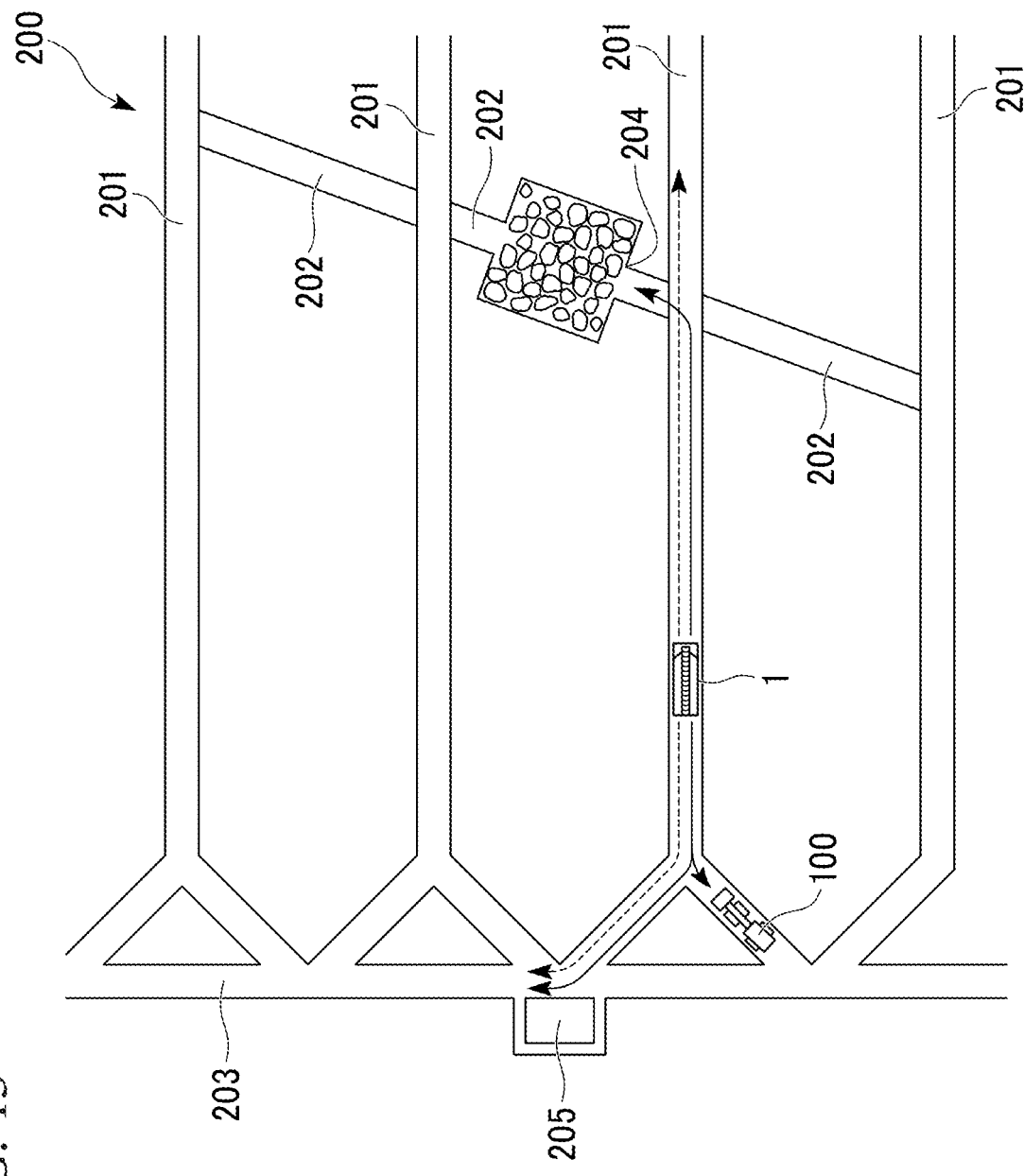
FIG. 13 is a plan view illustrating a fifth mode of use of the mined material transport vehicle according to the embodiment of the present invention.

In addition, for example, the operation illustrated in FIG. 13 may be performed. In this operation, as an example, the loading vehicle 100 and the mined material transport vehicle 1 on the drift 201 are disposed on an opposite side to the dump site 205 to face forward. That is, unlike the herringbone type illustrated in FIGS. 9 to 12, the footprint 200 of FIG. 13 is an El Teniente type. Therefore, a direction of the mined material transport vehicle 1 on the drift 201 may be opposite to that in FIGS. 9 to 12.

After mining ore from the mining site 204, the loading vehicle 100 moves backward onto the drift 201. At this time, the mined material transport vehicle 1 stands by on the front side of the loading vehicle 100 (the side opposite to the dump site 205). After the loading vehicle 100 loads ore on the mined material transport vehicle 1, the loading vehicle 100 mines ore again, moves toward the dump site 205 by moving backward, and retreats on another branch passage different from a branch passage leading to the dump site 205 in the drift 201. During this time, the mined material transport vehicle 1 moves backward on the drift 201, passes through the branch passage leading to the dump site 205, and moves to the dump site 205. After discharging ore at the dump site 205, the mined material transport vehicle 1 moves forward on the drift 201 to the original standby location. The loading vehicle 100 then goes back to the drift 201, moves backward, moves to the dump site 205 and discharges the ore. That is, the loading vehicle 100 dumps the ore from the front side by moving forward to the dump site after passing through the dump site once. After the dumping, the loading vehicle 100 moves forward to the mining site 204.

Depending on the crossing aspect of the drifts 201 and the crosscuts 202 and the location of the dump site 205, it is possible to carry out mining and transportation of ore smoothly by performing the above operation.

In addition, the loading vehicle 100 may be accessed by moving forward with respect to the dump site by turning at a branch road serving as a retreat place of the mined material transport vehicle 1. Thus, it is possible to dump ore at the dump site from the front side of the mined material transport vehicle 1.

Other Embodiments

The embodiments of the present invention have been described above, but the present invention is not limited thereto, and can be appropriately modified without departing from the technical idea of the present invention.

For example, in the present embodiment, an example in which the apron feeder 30 is used in the loading platform 20 has been described, but a belt conveyor having a belt and a roller may be used instead of the apron feeder 30. In other words, another conveyor having a conveying surface formed by a configuration of an endless shape may be used instead of the apron feeder 30.

Figure 14:
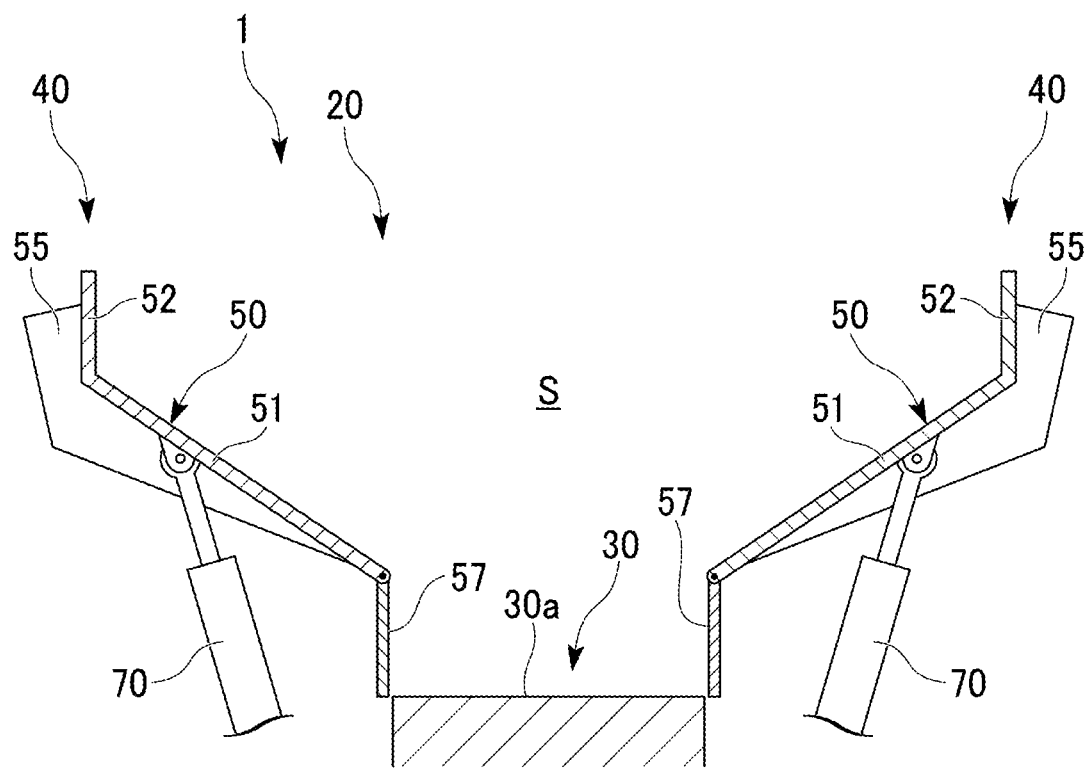
FIG. 14 is a cross-sectional view including a vehicle width direction of a mined material transport vehicle according to a modified example of the embodiment of the present invention.

For example, as shown in FIG. 14, a pair of lower guides 57 may be provided on both sides in the vehicle width direction of the conveying surface 30a so as to rise upward from the conveying surface 30a. In this case, the lower ends of the lateral guides 40 are positioned in the vicinity of the upper ends of the lower guides 57. This also makes it possible to prevent ore from coming off from the conveying surface 30a due to the lower guide 57, so that the ore on the conveying surface 30a can be smoothly conveyed to the conveying direction C forward side.

Further, for example, without providing the rear closing plate 56, the entire end portion of the storage space S on the conveying direction C rearward side may be opened and closed by the rear gate 62. By reversely rotating the sprocket 32A to convey the ore on the conveying surface 30a to the conveying direction C rearward side, it is possible to discharge ore from the rear portion of the storage space S as well.

Further, for example, a sensor for detecting the volume or weight of ore in the storage space S may be provided, and the movable flaps 50 may be rotated when a value detected by the sensor exceeds a predetermined value.

In the embodiment, an example in which the conveying surface 30a is inclined has been described; however, the conveying surface 30a only has to extend in the forward-rearward directions, and thus may extend, for example, parallel to a horizontal surface.

INDUSTRIAL APPLICABILITY

According to the mined material transport vehicle related to the present invention, it is possible to improve excavation efficiency.

DESCRIPTION OF REFERENCE NUMERALS

1: Mined Material Transport Vehicle
10: Vehicle Main Body
11: Vehicle Body Front Portion
12: Front Wheel
13: Vehicle Body Rear Portion
14: Rear Wheel
15: Support Bracket
16: Connection Portion
20: Loading Platform
30: Apron Feeder (Conveyor)
30a: Conveying Surface
30b: Roller
32A: Sprocket
32B: Idler
33: Chain
34: Apron
35: Plate
40: Lateral Guide
41: Front Fixed Guide
42: Rear Fixed Guide
50: Movable Flap
51: Inclined Plate
52: Rising Plate
55: Flap Guide
56: Rear Closing Plate
57: Lower Guide
60: Front Gate (Opening-Closing Unit)
61: Front Opening-Closing Plate
62: Rear Gate (Opening-Closing Unit)
63: Rear Opening-Closing Plate
70: Lateral Cylinder (Drive Unit)
71: Front Cylinder
71a: Bracket
72: Rear Cylinder
72a: Rib
72b: Bracket
72c: Link
80: Mined Material Guide
81: Support Portion
82: Lateral Plate
83: Vertical Plate
90: Battery Device
91: Travel Inverter
92: Travel Motor
93: Pump Inverter
94: Pump Motor
95: Hydraulic Pump
96: Hydraulic Valve
97: Feeder Hydraulic Motor
98: Steering Cylinder
100: Loading Vehicle
200: Footprint
201: Drift
202: Crosscut
203: Outer Peripheral Passage
204: Mining Site
205: Dump Site
210: Ore Deposit (Ore Body)
211: Ore
C: Conveying Direction
O1: Lateral Axial Line (Axial Line)
O2: Front Axial Line
O3: Rear Axial Line
S: Storage Space
M: Mine

The invention claimed is:

1. A mined material transport vehicle, comprising:
a vehicle main body capable of moving forward and rearward; and
a loading platform provided on the vehicle main body, wherein the loading platform comprises:
a conveyor provided on the vehicle main body and having a conveying surface capable of conveying a mined material in a conveying direction extending in forward-rearward directions of the vehicle main body;
front fixed guides provided on both sides of the conveying surface in the vehicle width direction in a front portion of the conveying surface,
a pair of movable flaps extending in the conveying direction, provided on both sides of the conveying surface in a vehicle width direction in a rear side of the front fixed guides in the conveying direction, forming a storage space together with the conveying surface, and being rotatable about an axial line extending in the conveying direction; and
a drive unit configured to rotate the movable flaps about the axial line from a position where the front end of the movable flaps is continuous with the rear end of the front fixed guides to a position where the front end of the movable flaps is positioned at an outer side in the vehicle width direction of a rear end of the front fixed guides.

2. The mined material transport vehicle according to claim 1,
wherein the vehicle main body is an articulated type including a vehicle body front portion and a vehicle body rear portion that are connected to each other so as to be rotatable in a horizontal direction.

3. The mined material transport vehicle according to claim 1,
wherein each movable flap extends to the outer side in the vehicle width direction while extending upward.

4. The mined material transport vehicle according to claim 1,
wherein the loading platform includes a flap guide that covers a rotation range of each movable flap from the conveying direction.

5. The mined material transport vehicle according to claim 1, further comprising:
an opening-closing unit that is provided at an end portion of the conveying surface in the conveying direction and that is capable of opening and closing the storage space.

6. The mined material transport vehicle according to claim 1,
wherein the conveying surface is inclined so as to extend upward toward one side in the forward-rearward directions.

7. The mined material transport vehicle according to claim 6, further comprising
a mined material guide provided on one side of the conveyor in the forward-rearward directions and guiding the mined material falling from an end portion of the conveying surface in the forward-rearward directions toward the one side in the forward-rearward directions.

8. The mined material transport vehicle according to claim 2,
wherein each movable flap extends to an outer side in the vehicle width direction while extending upward.

9. The mined material transport vehicle according to claim 2,
wherein the loading platform includes a flap guide that covers a rotation range of each movable flap from the conveying direction.

10. The mined material transport vehicle according to claim 3,
wherein the loading platform includes a flap guide that covers a rotation range of each movable flap from the conveying direction.

11. The mined material transport vehicle according to claim 2, further comprising:
an opening-closing unit that is provided at an end portion of the conveying surface in the conveying direction and that is capable of opening and closing the storage space.

12. The mined material transport vehicle according to claim 3, further comprising:
an opening-closing unit that is provided at an end portion of the conveying surface in the conveying direction and that is capable of opening and closing the storage space.

13. The mined material transport vehicle according to claim 4, further comprising:
an opening-closing unit that is provided at an end portion of the conveying surface in the conveying direction and that is capable of opening and closing the storage space.

14. The mined material transport vehicle according to claim 2,
wherein the conveying surface is inclined so as to extend upward toward one side in the forward-rearward directions.

15. The mined material transport vehicle according to claim 3,
wherein the conveying surface is inclined so as to extend upward toward one side in the forward-rearward directions.

16. The mined material transport vehicle according to claim 4,
wherein the conveying surface is inclined so as to extend upward toward one side in the forward-rearward directions.

17. The mined material transport vehicle according to claim 5,
wherein the conveying surface is inclined so as to extend upward toward one side in the forward-rearward directions.

18. The mined material transport vehicle according to claim 14, further comprising
a mined material guide provided on one side of the conveyor in the forward-rearward directions and guiding the mined material falling from an end portion of the conveying surface in the forward-rearward directions toward the one side in the forward-rearward directions.

19. The mined material transport vehicle according to claim 15, further comprising
a mined material guide provided on one side of the conveyor in the forward-rearward directions and guiding the mined material falling from an end portion of the conveying surface in the forward-rearward directions toward the one side in the forward-rearward directions.

20. The mined material transport vehicle according to claim 16, further comprising
a mined material guide provided on one side of the conveyor in the forward-rearward directions and guiding the mined material falling from an end portion of the conveying surface in the forward-rearward directions toward the one side in the forward-rearward directions.

* * * * *